(12) United States Patent
Wan et al.

(10) Patent No.: US 7,054,556 B2
(45) Date of Patent: May 30, 2006

(54) CHANNEL IDENTIFICATION IN COMMUNICATIONS NETWORKS

(75) Inventors: Ping Wai Wan, Kanata (CA); Derrick Remedios, Nepean (CA); Dongxing Jin, Ottawa (CA); Patrick Chilufya Chimfwembe, Nepean (CA)

(73) Assignee: Tropic Networks Inc., Kanata (CA)

( * ) Notice: Subject to any disclaimer, the term of this patent is extended or adjusted under 35 U.S.C. 154(b) by 383 days.

(21) Appl. No.: 09/972,991

(22) Filed: Oct. 10, 2001

(65) Prior Publication Data

US 2003/0067646 A1    Apr. 10, 2003

(30) Foreign Application Priority Data

Oct. 5, 2001    (CA) .................................... 2358382

(51) Int. Cl.
*H04B 17/00*    (2006.01)
(52) U.S. Cl. ...................................................... 398/32
(58) Field of Classification Search ................ 398/79, 398/193, 198, 212, 31, 183, 32, 9; 375/340, 375/208, 376; 359/337.12; 385/2, 4, 8; 379/220, 229; 370/465, 529; 455/71
See application file for complete search history.

(56) References Cited

U.S. PATENT DOCUMENTS

| | | | |
|---|---|---|---|
| 4,747,095 A | 5/1988 | Crookshanks | 370/307 |
| 5,216,417 A | 6/1993 | Honda | 345/89 |
| 5,513,029 A | 4/1996 | Roberts | 359/177 |
| 5,959,749 A | 9/1999 | Danagher et al. | 359/124 |
| 5,974,094 A | 10/1999 | Fines et al. | 375/335 |
| 6,078,412 A | 6/2000 | Fuse et al. | 398/1 |
| 6,101,012 A | 8/2000 | Danagher et al. | 359/127 |
| 2003/0067647 A1* | 4/2003 | Wan et al. | 359/124 |

(Continued)

FOREIGN PATENT DOCUMENTS

WO    WO 99/33200    7/1999

OTHER PUBLICATIONS

Hill, G.R., et al, "A Transport Network Layer Based on Optical Network Elements", Journal of Lightwave Technology, IEEE, New York, USA, vol. 11, No. 5/6, May 1, 1993, pp. 667-676.

Richard G. Lyons, "Understanding Digital Signal Processing", published by Addison-Wesley Publishing Company, Copyright 1997, pp. 319-349.

(Continued)

*Primary Examiner*—David C. Payne
(74) *Attorney, Agent, or Firm*—Victoria Donnelly

(57) ABSTRACT

Channels in an optical WDM network are each identified by at least two dither tones with which the channel is modulated, the dither tones alternating with a predetermined periodicity so that at any instant each channel is modulated by only one dither tone. The dither tones are continuously generated at precise frequencies. Channel detection by detecting the dither tones, for channels having optical powers over a wide dynamic range, makes use of an FFT process which can detect dither tones for high power channels in a single operation. Coherent averaging of FFT results over time is used to detect dither tones for low power channels over multiple FFT operations.

15 Claims, 2 Drawing Sheets

U.S. PATENT DOCUMENTS

2003/0067651 A1* 4/2003 Wan et al. ............... 359/133
2004/0062548 A1* 4/2004 Obeda et al. ............. 398/25
2004/0062549 A1* 4/2004 Obeda et al. ............. 398/30

OTHER PUBLICATIONS

Fred Heismann, Mohammad T. Fatehi, Steven K. Korotky, and John J. Veselka, "Signal Tracking and Performance Monitoring in Multi-Wavelength Optical Networks", WeB 2.2, $22^{nd}$ European Conference on Optical Communication-ECOC'96, Oslo, pp. 3.47-3.50.

G.R. Hill et al., "A Transport Network Layer Based on Optical Network Elements", Journal of Lightwave Technology, vol. 11, No. 5/6, May/Jun. 1993, pp. 667-679.

* cited by examiner

CHANNEL IDENTIFICATION IN COMMUNICATIONS NETWORKS

This invention relates to channel identification in communications networks or systems. The invention is generally applicable to communications networks or systems using any type of communications media, such as optical, wireless, or wired communications systems, but is particularly applicable to, and is described below in the context of, optical WDM (wavelength division multiplex) communications networks or systems.

BACKGROUND

In optical WDM communications networks or systems it has been proposed to identify each of a plurality of optical signals or channels, each at an individual optical wavelength, with a respective relatively low frequency dither tone with which the intensity or amplitude of the respective optical signal is modulated. For example, in a WDM network in which optical signals are each modulated with data at a high bit rate, for example 2.5 Gb/s or more, each optical signal may also be modulated with a respective dither tone in a relatively low frequency range, for example about 10 kHz to about 100 kHz or more. The dither tone modulation can be provided with a specific modulation depth, thereby not only providing channel identification but also power level information for the optical signal, thereby to facilitate functions such as performance monitoring and fault management in the network.

Examples of such proposals are disclosed in Hill et al., "A Transport Network Layer Based On Optical Network Elements", IEEE Journal of Lightwave Technology, Volume 11, No. 5/6, pages 667–679, May/June 1993, and in Roberts U.S. Pat. No. 5,513,029, issued Apr. 30, 1996 and entitled "Method And Apparatus For Monitoring Performance Of Optical Transmission Systems".

Heismann et al., "Signal Tracking And Performance Monitoring In Multi-Wavelength Optical Networks", 22nd European Conference on Optical Communication—ECOC'96, pages 3.47 to 3.50, 1996 also discloses such a proposal in which a pilot tone which acts like a dither tone can further be modulated using frequency-shift keying (FSK) with an additional digital signal providing digital information, such as optical routing information. For example, this article discloses FSK modulation of tones at 10 kHz and 12 kHz each with ±500 Hz frequency excursions in accordance with respective 100 b/s digital signals.

While such proposals provide the advantage that optical channels can be identified and their power levels monitored without detection and demodulation of the optical channel itself and without serious adverse effects on the optical channels, they fail to meet increasing requirements of WDM networks in several respects.

More particularly, such proposals provide a limited number of distinguishable dither tones, each of which identifies a respective optical channel so that the WDM network can have only a similarly limited number of optical channels. In addition, detection of such tones can be very difficult. For example, an optical fiber in a WDM network may carry up to 32 optical channels within a wide optical dynamic range of for example 30 dB (a dynamic range of 60 dB for the corresponding electrical signals) or more. Detection of a dither tone for an optical channel at the lower end of this dynamic range is very difficult in the presence of possibly many other optical channels higher in this dynamic range, because the latter constitute noise for the detection process.

Further, dither tone detection can be complicated by the presence of other interference, such as interference tones that occur with a frequency spacing of about 8 kHz in the case of SONET (synchronous optical network) communications.

A need therefore exists for an improved method of and apparatus for channel identification which can facilitate robust detection of dither tones for identification of larger numbers of channels in a communications network, in particular an optical WDM network.

SUMMARY OF THE INVENTION

According to one aspect of this invention there is provided a method of identifying and detecting channels in a multiplexed communications network, comprising the steps of: modulating each channel to be identified with a respective combination of at least two continuous dither tones; and detecting the dither tones to detect said channels, the step of detecting the dither tones comprising performing an FFT (Fast Fourier Transform) operation to detect dither tones of a channel having a relatively high power and performing coherent averaging of FFT results over a plurality of FFT operations to detect dither tones of a channel having a relatively low power.

The step of modulating each channel to be identified with a respective combination of at least two continuous dither tones can comprise modulating each channel alternately, with a predetermined periodicity, with a respective one of two continuous dither tones, or modulating each channel with a respective one of at least three continuous dither tones with a cyclic repetition and a predetermined periodicity.

The method is particularly desirable and advantageous when the multiplexed communications network comprises an optical WDM network and each channel comprises an optical channel.

The continuous nature of the dither tones enables the coherent averaging to take place to detect the dither tones of relatively low power channels over many FFT operations, while the dither tones of relatively high power channels can be detected in a single FFT operation. The use of at least two dither tones to identify each channel greatly increases the number of channels that can be identified. The alternating or cyclic repetition of the dither tones with a predetermined periodicity ensures that each channel is modulated at any time with only one of its identifying dither tones, whereby degradation of data carried by the channel is substantially avoided without disrupting the coherent averaging.

Another aspect of the invention provides a method of identifying optical channels in an optical WDM network, comprising the steps of: continuously generating dither tones at a plurality of frequencies; and intensity modulating each of a plurality of optical channels to be identified with a respective selection of at least two of said dither tones in a cyclically repeated sequence and with a predetermined periodicity.

This method can further comprise the step of detecting intensity modulation of at least one optical signal, detecting dither tones of the optical signal using an FFT (Fast Fourier Transform) operation, and performing coherent averaging of FFT results over a plurality of FFT operations.

The invention also provides a modulating arrangement comprising: a plurality of continuous dither tone sources; a selector for selecting at least two dither tones from said sources in a cyclically repeated sequence and with a predetermined periodicity; a modulator for modulating a channel of a multiplexed communications network with the cyclically repeated sequence of dither tones from the selector; and a feedback loop for maintaining a predetermined modulation depth of the channel by the modulator.

The invention further provides a detection arrangement for use in a multiplexed communications network including a modulating arrangement as recited above, the detection arrangement comprising a detector for detecting the modulation by said modulator, an FFT (Fast Fourier Transform) operation for producing FFT results corresponding to said dither tones, and an arrangement for coherent averaging of the FFT results over a plurality of FFT operations. In particular, the detector may comprise an optical detector for detecting intensity modulation of an optical signal in an optical WDM network.

BRIEF DESCRIPTION OF THE DRAWINGS

The invention will be further understood from the following description by way of example with reference to the accompanying drawings, in which.

DETAILED DESCRIPTION

Figure 1:
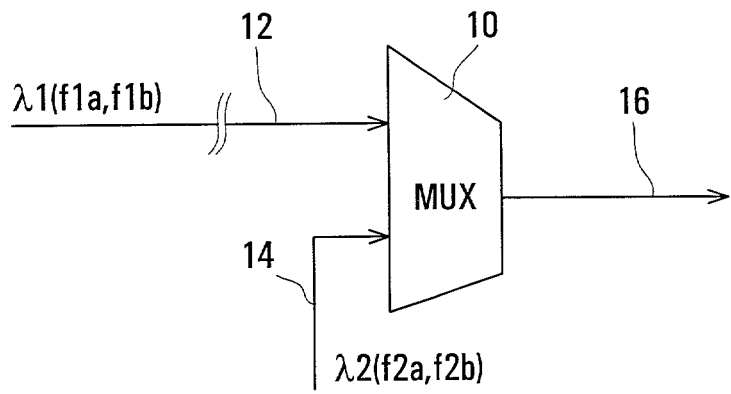
FIG. 1 illustrates an optical multiplexer arrangement with reference to which a problem addressed by an embodiment of the invention is explained.

As indicated initially above, embodiments of the invention are described below in the context of an optical WDM network, but the invention is also generally applicable to, and the described embodiments of the invention may be adapted for operation in, other types of communications network.

As described above, one disadvantage of known channel identification proposals is that each optical channel is identified by a respective dither tone, and there is a limited number of dither tone frequencies and hence a similarly limited number of optical channels in the WDM network. While this number can be increased by increasing a frequency range over which the dither tones extend and/or by decreasing a frequency spacing of the dither tones within this range, such steps involve other disadvantages, such as an increased potential for interference with data signals and/or increased difficulty in distinguishing the dither tones from one another.

In embodiments of this invention, this disadvantage is greatly reduced or eliminated by using a combination of two or more dither tones for identification of each optical channel. For example, an optical WDM network may provide 1600 dither tones in a frequency range from about 48 kHz to about 64 kHz with a constant separation or frequency spacing of 10 Hz between adjacent dither tones. A combination of, for example, two such tones is used to identify each optical channel, so that the number of channels which can be identified is increased, from 1600 using one such tone to identify each channel as in the known proposals, to the order of 2.5 million.

A combination of a greater number of dither tones, for example three or more, can alternatively be used to identify individually an even greater number of optical channels, so that the WDM network can have a virtually unlimited number of individually identifiable optical channels. Similarly, a combination of a greater number of dither tones can be used in a redundant manner to increase reliability or robustness of the channel identification, even in the case of low optical power levels and interference. For example, each optical channel can be identified by a respective combination of three dither tones, the channel being detected by detection of at least any two of the three dither tones.

For simplicity in the following description it is assumed that each optical channel is identified by a respective combination of two dither tones. The nature of the combination of the dither tones is discussed further below.

Also, in order to increase the robustness of the channel identification in the presence of interference, some constraints may be placed on the particular selections of dither tones used to identify each optical channel. For example, with SONET interference tones occurring with a frequency spacing of about 8 kHz as described above, the dither tones selected for each channel identification may be selected to avoid spacings of about 8 kHz between them, so that at worst only one of the two (or more) dither tones is subject to these interference tones.

The combination of the two (or more) dither tones for each channel identification is preferably an alternation (or cyclic repetition) of the two (or more) dither tones, each dither tone being modulated onto the respective optical channel in turn for a predetermined period as further described below. Thus the dither tones are alternately (or cyclically) switched to modulate and thereby identify the respective optical channel.

Although such switching of the dither tones is preferred as discussed further below, other ways of combining the dither tones are possible. For example, the dither tones for identifying each channel may be summed and the respective optical channel modulated with the resulting summed signal. However, this is not preferred because this composite modulation undesirably produces greater closure of the "eye" for detection of the high speed data signal carried by the optical channel. Such eye closure is further increased using a sum of more than two dither tones for each channel identification.

It can be appreciated that the alternated modulation of an optical channel with two dither tones as described above is distinct and different from the FSK modulation of a single tone channel identifier as described in the article by Heismann et al. referred to above, even in the event that the latter carries an FSK modulation of alternating one and zero binary digits. In the case of two dither tones as described above, the two frequencies can be relatively arbitrarily selected, so that the number of different optical channels that can be identified is greatly increased; both frequencies are detected for complete channel identification; and as described further below each dither tone has a predetermined duration independent of any digital signal. In contrast, in the Heismann et al. proposal the two dither tones used to constitute an FSK modulated signal do not increase (and may substantially decrease) the number of optical channels that can be individually identified, and have a precise frequency relationship to constitute FSK signals; furthermore the duration of each dither tone burst is dependent upon the modulating digital signal, and only one of the two FSK frequencies needs to be detected (as illustrated in FIG. 2(a) of Heismann et al.) for channel identification and recovery of the modulating digital signal.

As discussed above, a significant difficulty with known proposals for channel identification using dither tones arises from a wide dynamic range of optical signals which can occur in an optical WDM network. This is further described below by way of a very simple example represented by FIGS. 1 and 2.

Referring to FIG. 1, an optical multiplexer 10 is illustrated as being supplied with two optical signals on optical paths 12 and 14, and producing a multiplexed optical signal on an optical path 16. The optical signal on the path 12 is assumed to comprise an optical channel having a wavelength λ1, this channel being identified by two alternating dither tones f1a and f1b in the manner described above. The optical signal on the path 14 is assumed to comprise an optical channel having a wavelength λ2, this channel being identified by two alternating dither tones f2a and f2b also in the manner described above.

Figure 2:
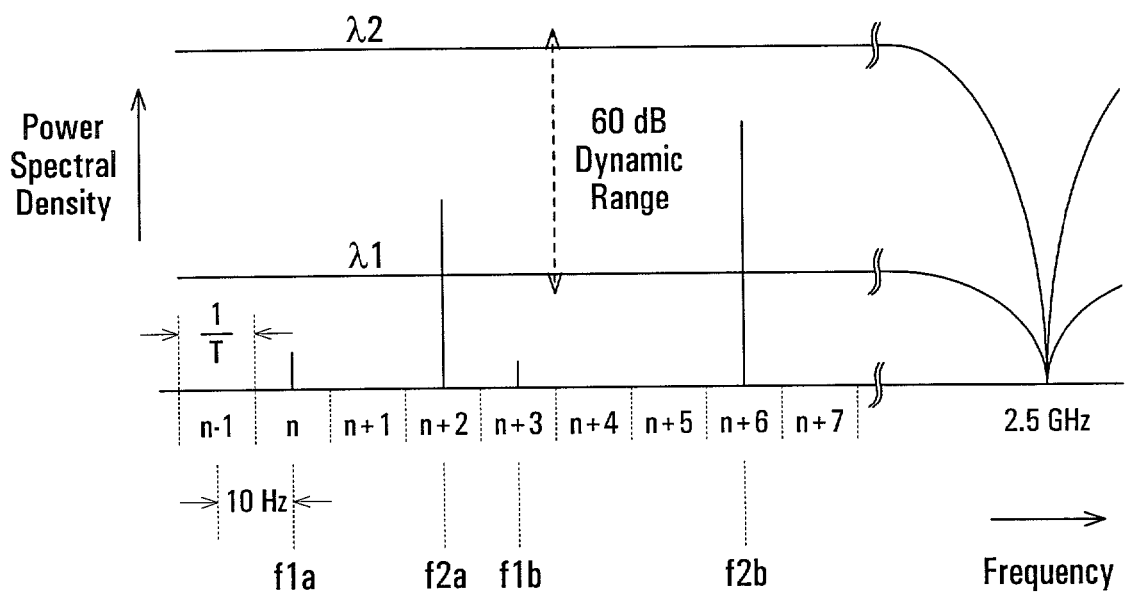
FIG. 2 diagrammatically illustrates possible relative optical powers of optical signals in the arrangement of FIG. 1.

FIG. 2 represents part of a graph of relative optical power versus frequency, for the optical channels at the wavelengths λ1 and λ2, over a small part of the frequency range which includes the dither tones f1a and f1b, which are assumed for convenience of illustration to be close together. As dither tone detection is typically performed using an FFT (Fast Fourier Transform) process which produces total energy or power results for respective frequency bins or frequency ranges, the frequency axis in FIG. 2 is labelled in accordance with such frequency bins numbered n−1 to n+3 where n is an integer. For a constant spacing of adjacent dither tones of 10 Hz as stated above by way of example, these frequency bins are centered at frequencies 10 Hz apart, and each frequency bin has a width 1/T which is inversely determined by a period T over which the FFT process is performed. As illustrated in FIG. 2, the dither tones f1a and f1b are at the centres of the frequency bins n and n+3 respectively.

The high speed data carried by the optical channels is typically NRZ (non-return to zero) data having a sinc ((sin x)/x) frequency characteristic, which is not zero over the low frequency range of the dither tones. Accordingly, optical signals have in this frequency range relative optical powers which may be anywhere within a wide dynamic range, typically a range of about 30 dB or more as indicated above and as represented in FIG. 2 by a vertical dashed line. The optical powers of the signals within the respective frequency bins of the FFT process constitute noise which detracts from the dither tone detection.

By way of example, it is assumed that the optical channel at the wavelength λ1 has a relative optical power near the low end of this dynamic range; for example this optical channel may have traversed a large number of attenuating optical components. It is also assumed that the optical channel at the wavelength λ2 has a relative optical power near the high end of this dynamic range; for example it may have been supplied from a local modulated laser source. Over the frequency range shown in FIG. 2 the relative optical powers of these channels are substantially constant and are represented by horizontal lines labelled λ1 and λ2 respectively. In accordance with a relatively small modulation depth of each optical channel with its respective dither tones, the relative levels of the dither tones f1a and f1b for the relatively weak optical channel at the wavelength λ1 are very small, as shown in FIG. 2. The dither tones f2a and f2b for the optical channel at the wavelength λ2 are assumed to be outside the frequency range of FIG. 2, and accordingly the relative levels of these are not shown in FIG. 2.

It can be appreciated that detecting the dither tones f1a and f1b in the presence of a very much larger noise component constituted by the optical channel at the wavelength λ2 presents a difficult problem. Furthermore, this problem is exacerbated in the event, as may be typical, that the optical path 16 carries multiple optical channels with similarly high relative optical powers. For example, in an optical WDM network each such optical path may carry up to 32 optical channels.

One way in which this problem can potentially be reduced is to decrease the width of each frequency bin in the FFT process, thereby reducing the noise component within each frequency bin due to the optical channels. This corresponds to an increase in the period T of the FFT process, thereby considerably increasing its computational and memory requirements, and also increasing a delay for detection of the dither tones. For a wide dynamic range of 30 dB as indicated above, the period T may need to be of the order of 100 seconds, and these requirements and the corresponding delay are increased to such an extent that this approach becomes impractical.

It can be appreciated that this also necessitates a very precise generation of each dither tone. For example, a period T of 100 seconds corresponds to a frequency bin width of 0.01 Hz, requiring a substantially better precision than this for generation of the dither tones.

Although these difficulties are significant for the extreme condition of optical signals being at opposite extremes of the wide dynamic range as illustrated in FIG. 2, it can be realised that in most situations such extreme conditions will not apply. For optical signals all of which are within a smaller dynamic range of for example about 20 dB, it can be practical to detect the dither tones for all of the optical channels using an FFT process with a period T of for example 1 second and frequency bins of width 1 Hz, considerably reducing the FFT computational and memory requirements and the detection delay in such more usual conditions.

In view of these considerations, in an embodiment of the invention as described below an FFT process is used with a period T, for example 1 second, which is sufficiently short to be practical in terms of computation, memory, and delay requirements and which in many cases of typical optical power levels is sufficient to permit their dither tones to be detected within this FFT period, i.e. in a single FFT operation. This FFT process is supplemented by coherent averaging of the FFT results over longer periods, i.e. over a plurality, possibly many, FFT operations, enabling dither tones of channels at lower relative powers also to be detected even where different ones of the optical channels have powers at both extremes of the dynamic range, extending over the maximum dynamic range of for example 30 dB.

To permit this coherent averaging, the dither tones are continuously generated, and the alternating switching between the two dither tones identifying each optical channel has precisely controlled periods, so that a dither tone detector can determine precisely a phase relationship between successive bursts of each dither tone, as further described below. In addition, the dither tones are generated with a desired accuracy, conveniently all being derived from a single, high frequency, stable oscillator.

Figure 3:
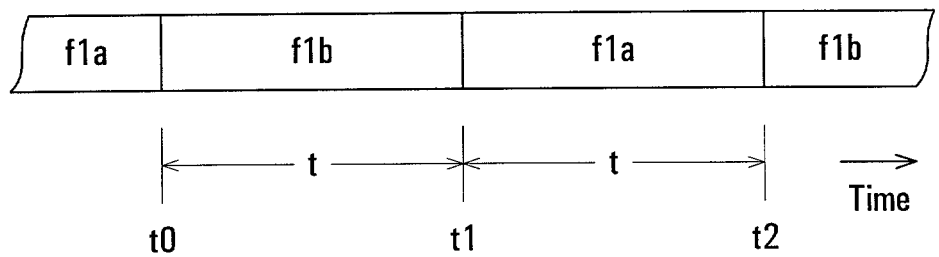
FIG. 3 illustrates successive bursts of dither tones providing a channel identification.

By way of example, it is assumed that a duration t of a dither tone switched alternatingly for modulation and hence identification of a respective optical channel is the same for all dither tones and for all optical channels. Conveniently, this duration t may be of the order of 1 second. FIG. 3 illustrates consequent successive bursts of the dither tones f1a and f1b which are used for modulation and identification of the optical channel having the wavelength λ1 as described above.

Referring to FIG. 3, the respective optical channel having the wavelength λ1 is modulated alternately as described above with the dither tones f1a and f1b. At a switching time t0, there is a switch of the modulating dither tone from f1a to f1b. Subsequently, at a switching time t1 there is a switch of the modulating dither tone from f1b back to f1a, at a switching time t2 there is a switch of the modulating dither tone from f1a back to f1b, and so on. Each dither tone burst has a duration t, i.e. the switching times t0, t1, t2, and so on occur periodically with the time spacing t.

Although there may be a phase discontinuity between the modulating dither tones at the respective switching times, the facts that these switching times occur with the periodicity t and each dither tone is produced continuously mean that there is a precisely determinable phase relationship between successive bursts of each dither tone. Thus there is a phase difference of $2\pi t f$ between the end of each burst of a dither tone and the start of the next burst of the same dither tone after an interval t, where f is the frequency of the respective dither tone. Thus for the dither tone f1a this phase difference, between the switching times t0 and t1, is $2\pi t$ (f1a), and for the dither tone f1b this phase difference, between the switching times t1 and t2, is $2\pi t$(f1b).

Knowing the periodicity t, each dither tone detector can accordingly determine this phase difference for each dither tone, and use the determined phase difference for coherent averaging of the FFT results for the respective dither tone over a plurality, possibly a large number, of FFT processing periods or FFT operations. The noise energy due to the optical signals over such periods is not similarly coherent, so that the coherent averaging, which is an accumulation of FFT results for each respective frequency bin in accordance with amplitude and phase over time, enhances the detection of the respective dither tone relative to this noise.

Figure 4:
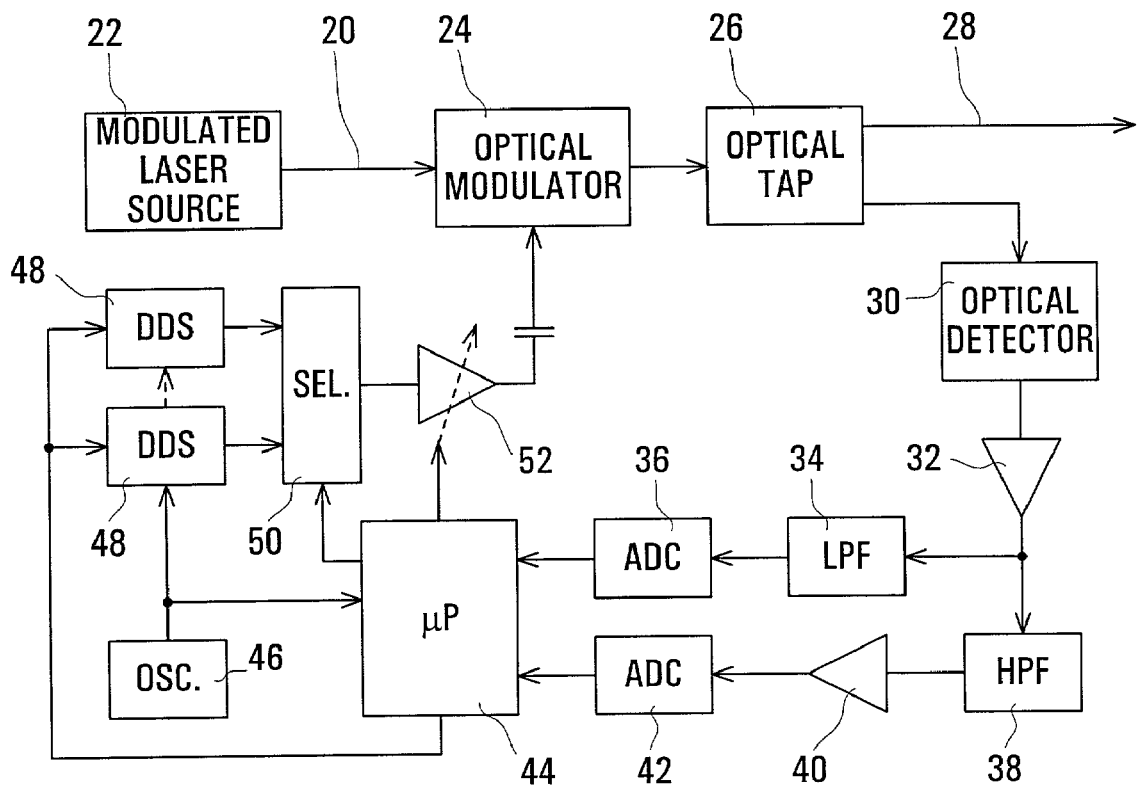
FIG. 4 illustrates one form of dither tone generator and modulating arrangement in accordance with an embodiment of the invention.

FIG. 4 illustrates one form of dither tone generator and modulating arrangement which can be used in an embodiment of the invention. Referring to FIG. 4, an optical channel is provided on an optical fiber or path 20 from a modulated laser source 22, and is supplied via an optical modulator 24 and an optical tap 26 to an ongoing optical path 28. The source 22 provides the optical channel at a desired optical wavelength and modulated with data to be carried by the optical channel, typically at a high bit rate of for example 2.5 Gb/s. The data modulation can alternatively be carried out separately from the source 22, either on the optical path 20 or on the optical path 28 after the optical tap 26, the optical modulator 24 in the latter case modulating an optical carrier for the optical channel. In any event, the optical modulator 24 provides intensity modulation of the optical channel for channel identification as described below.

The optical tap 26 supplies a small portion, e.g. 5%, of the optical output of the modulator 24 to an optical detector 30 whose electrical output is amplified by an AGC (automatic gain controlled) amplifier 32. An output of the amplifier 32 is supplied via a low pass filter (LPF) 34 to an analog-to-digital converter (ADC) 36, and via a band pass or high pass filter (HPF) 38 and an amplifier 40 to an ADC 42. The ADCs 36 and 42 produce digital signals which are supplied to a digital signal processor or microprocessor ($\mu$P) 44.

An oscillator 46 provides a stable source of a signal, for example at a frequency of 50 MHz, which is supplied to the microprocessor 44 and to each of a plurality of direct digital synthesizers (DDSs) 48. Each DDS 48 is arranged to produce, under programmed control of the microprocessor 44, a respective one of the dither tones on a respective input to a selector 50. An output of the selector 50 is coupled via a controlled gain amplifier 52 and a capacitive coupling to a control input of the optical modulator 24. The selector 50 and the gain of the amplifier 52 are controlled by the microprocessor 44.

In operation, each DDS 48 is arranged to produce continuously a respective one of the dither tones to be used for identification of the respective optical channel; for example the dither tones f1a and f1b for the optical channel $\lambda 1$ as described above can be produced each by a respective one of two DDSs 48 at the source of this optical channel. The selector 50 is controlled by the microprocessor 44 to alternately select these dither tones with the periodicity t as described above, whereby these tones are modulated onto the optical channel by the optical modulator 24. In the case of more than two dither tones used for channel identification, there is a correspondingly increased number of DDSs 48 and selector inputs, and the selector 50 is controlled by the microprocessor 44 to select the respective dither tones in a cyclically repeating periodic sequence.

The LPF 34 and ADC 36 provide a DC feedback path to the microprocessor 44, and the HPF 34, amplifier 40, and ADC 42 provide a feedback path to the microprocessor 44 for the frequency band of the dither tones, in accordance with which the microprocessor 44 controls the gain of the amplifier 52 to maintain a desired constant depth of modulation by the optical modulator 24. For example, the modulation depth may be about 4%. The use of a constant modulation depth for channel identification facilitates determining optical power levels in the WDM network in known manner.

Although FIG. 4 represents an arrangement for only one optical channel, it can be appreciated that a similar arrangement can be provided for each optical channel, and that parts of these respective arrangements may be common for multiple optical channels. For example, it can be appreciated that the ADCs 36 and 42 and the microprocessor 44 can be multiplexed for operation for a plurality of optical channels, the oscillator 46 can be used in common for all of the optical channels, and only as many DDSs 48 are required as the number of dither tones used for identifying the respective optical channels.

Figure 5:
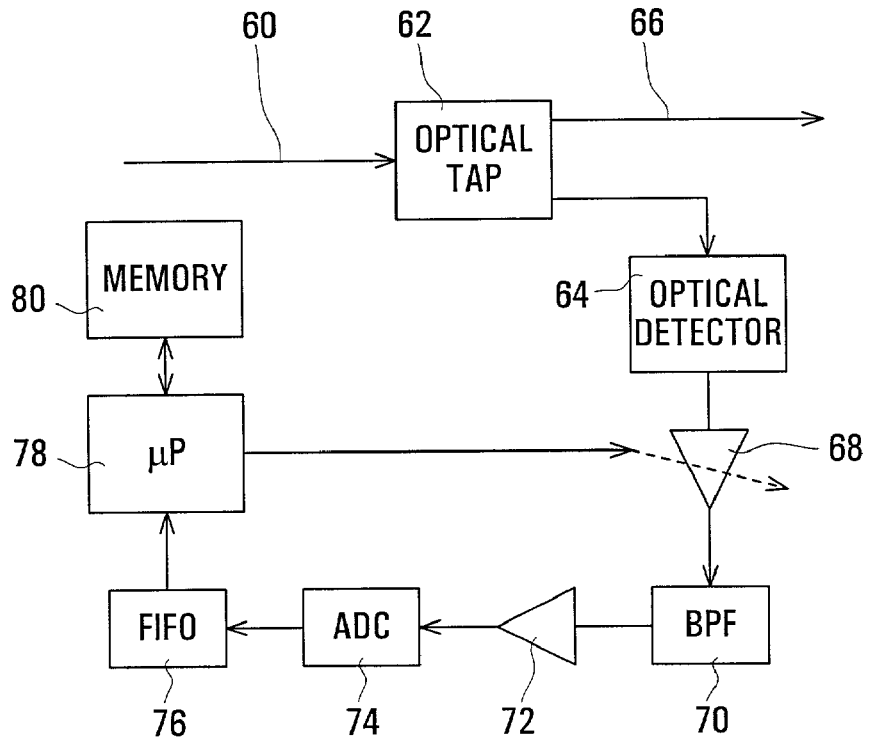
FIG. 5 illustrates one form of dither tone detection arrangement in accordance with an embodiment of the invention.

FIG. 5 illustrates a corresponding dither tone detection arrangement, which may be used at any desired point in the optical WDM network for identifying an optical channel on an optical fiber or path 60 by detecting the dither tones.

Referring to FIG. 5, an optical tap 52 supplies a small portion, e.g. 5%, of an optical signal on the path 60 to an optical detector 64, and supplies most of the optical signal power to an ongoing optical path 66. An electrical output of the optical detector 64 is amplified by a controlled gain amplifier 68, an output of which is supplied via a band pass filter (BPF) 70 and an amplifier 72 to an ADC 74. The BPF 70 has a pass band including the dither tone frequency range. The ADC 74 produces a digital signal which represents detected dither tones and is supplied to a digital signal processor or microprocessor 76. The microprocessor 76, which has an associated memory 78, controls the gain of the amplifier 68 in accordance with the power of the optical signal on the path 60.

The microprocessor 76 operates in known manner to perform FFT processing of the digital signals provided by the ADC 74, using the memory 78 for this FFT processing, in respective FFT periods T to detect any dither tone modulation of the optical signal on the optical path 60. As discussed above, this determines the respective dither tones, and hence the optical channel identification, in many instances of typical optical signal power levels. For ensuring detection of dither tones for relatively low power optical channels even in the presence of one or more relatively high power optical channels on the path 60, without increasing the FFT period T, coherent averaging of the FFT results is carried out over a plurality, possibly a large number, of successive FFT periods T as described above.

It is observed that there is no requirement for synchronization between, for example, the operation of the selector 50 in the dither tone generation arrangement of FIG. 4 and the FFT periods of the microprocessor 76 in the detection arrangement of FIG. 5. The continuous generation of each dither tone ensures that, regardless of the particular timing of the selection of this dither tone by a selector such as the selector 50, and regardless of the particular relative timing of the FFT periods T used in a detection arrangement, the coherent averaging over a plurality of such FFT periods will gradually result in accumulated results properly representing any dither tones which are present. As indicated above, such coherent averaging comprises an accumulation of the FFT frequency bin results, or amplitudes in accordance with their respective phase differences for successive FFT periods, these phase differences being determined by the microprocessor 76 of the detection arrangement from the dither tone frequencies and the known period t.

As indicated above, it is conceivable to replace the alternating dither tones, as described above for identification of each optical channel, by some other combination, such as a summation, of these dither tones, for example by replacing the selector 50 of FIG. 4 by a signal combiner or summer. However, as also indicated above, this is not preferred because it results in relatively increased modulation depth of each optical channel, with corresponding eye closure for detection of the high speed data signal carried by the optical channel.

In addition, although the description above relates to an optical WDM network in which optical channels are identified by having their intensity modulated with a combination of a plurality of dither tones, it can be appreciated that similar principles can be applied to identifying and detecting multiple channels in networks and systems using other types of communications media and modulation methods.

Thus although particular embodiments of the invention are described above, it can be appreciated that these and numerous other modifications, variations, and adaptations may be made without departing from the scope of the invention as defined in the claims.

The invention claimed is:

1. A method of identifying and detecting channels in a multiplexed communications network, comprising the steps of:
    modulating each channel to be identified with a respective combination of at least two continuous dither tones, each dither tone having a precisely determinable phase relationship sufficient for coherent processing of said each dither tone; and
    detecting the dither tones to detect said channels, the step of detecting the dither tones comprising performing an FFT (Fast Fourier Transform) operation to detect dither tones of a channel having a relatively high power and performing coherant averaging of FFT results over a plurality of FFT operations, comprising an accumulation of the FFT amplitudes in accordance with their said respectivve determinable phase relationships for successive FFT periods, to detect dither tones of a channel having a relatively low power.

2. A method as claimed in claim 1 wherein the step of modulating each channel to be identified with a respective combination of at least two continuous dither tones comprises modulating each channel alternately, with a predetermined periodicity, with a respective one of two continuous dither tones.

3. A method as claimed in claim 2 wherein the multiplexed communications network comprises an optical WDM network and each channel comprises an optical channel.

4. A method as claimed in claim 1 wherein the step of modulating each channel to be identified with a respective combination of at least two continuous dither tones comprises modulating each channel with a respective one of at least three continuous dither tones with a cyclic repetition and a predetermined periodicity.

5. A method as claimed in claim 1 wherein the multiplexed communications network comprises an optical WDM network and each channel comprises an optical channel.

6. A method of identifying optical channel in an optical WDM network, comprising the step of intensity modulating the optical channel with an alternating selection of at least two dither tones so that only one dither tone is modulated onto the optical channel at any given time, said dither tones are modulated in a cyclically repeated sequence and with a predetermined periodicity, wherein each dither tone in said alternating selection of dither tones is modulated onto the optical channel during its respective predetermined time interval.

7. A method as claimed in claim 6 wherein each optical channel to be identified is intensity modulated alternately with each of a respective two of said dither tones.

8. A method as claimed in claim 7 and further comprising the step of detecting intensity modulation of at least one optical signal, detecting dither tones of the optical signal using an FFT (Fast Fourier Transform) operation, and performing coherent averaging of FFT results over a plurality of FFT operations.

9. A method as claimed in claim 6 and further comprising the step of detecting intensity modulation of at least one optical signal, detecting dither tones of the optical signal using an FFT (Fast Fourier Transform) operation, and performing coherent averaging of FFT results over a plurality of FFT operations.

10. A modulating arrangement comprising:
    a plurality of continuous dither tone sources;
    a selector for selecting at least two dither tones from said sources in a cyclically repeated sequence and with a predetermined periodicity;
    a modulator for modulating a channel of a multiplexed communications network with the cyclically repeated sequence of dither tones from the selector; and
    a feedback loop for maintaining a predetermined modulation depth of the channel by the modulator.

11. A modulating arrangement as claimed in claim 10 wherein the selector is arranged for selecting alternately each of two dither tones from said sources.

12. A modulating arrangement as claimed in claim 10 wherein the multiplexed communications network comprises an optical WDM network and the modulator comprises an optical modulator for intensity modulating an optical channel of the optical WDM network.

13. A modulating arrangement as claimed in claim 12 wherein the selector is arranged for selecting alternately each of two dither tones from said sources.

14. A detection arrangement for use in a multiplexed communications network including a modulating arrangement as claimed in claim 10, the detection arrangement comprising a detector for detecting the modulation by said modulator, an FFT (Fast Fourier Transform) operation for producing FFT results corresponding to said dither tones, and an arrangement for coherent averaging of the FFT results over a plurality of FFT operations.

15. A detection arrangement as claimed in claim 14 wherein the detector comprises an optical detector for detecting intensity modulation of an optical signal in an optical WDM network.

* * * * *

UNITED STATES PATENT AND TRADEMARK OFFICE
CERTIFICATE OF CORRECTION

PATENT NO. : 7,054,556 B2
APPLICATION NO. : 09/972991
DATED : May 30, 2006
INVENTOR(S) : P. W. Wan et al.

It is certified that error appears in the above-identified patent and that said Letters Patent is hereby corrected as shown below:

Column 9, line 46, "coherant" is corrected to read as --coherent--

Column 9, line 49, "respectivve" is corrected to read as --respective--

Column 10, line 6, "identifying optical" is corrected to read as --identifying an optical--

Signed and Sealed this

Eighth Day of July, 2008

JON W. DUDAS
*Director of the United States Patent and Trademark Office*